Patented Oct. 31, 1933

1,932,653

UNITED STATES PATENT OFFICE 1,932,653

PREPARATION OF AMINO ETHERS AND DERIVATIVES THEREOF

Edgar C. Britton, Midland, Mich., assignor to The Dow Chemical Company, Midland, Mich., a corporation of Michigan No Drawing. Application March 19, 1928
Serial No. 262,998

14 Claims. (Cl. 260—130.5)

The present improvements relating as indicated to the preparation of amino ethers have more particular regard to the preparation of amino-aryl-alkyl ethers from the corresponding halogen aryl-alkyl ethers. However, it is to be understood that the process is not necessarily limited to such aryl-alkyl ethers, but is applicable generally, to the making of amino ethers having the formula $NH_2$—R—O—R', wherein R represents an aryl, and R', either an aryl or an alkyl group.

Heretofore the preparation of such amino ethers has usually been accomplished by the reduction of the corresponding nitro-aryl-alkyl ether. For example, p-phenetidine is ordinarily prepared by the reduction of p-nitro phenetole with iron and acid. I have now discovered that compounds of the class in question can be much more readily produced from the corresponding halogenated ethers by treating them with an aqueous or alcoholic solution of ammonia in the presence of a catalyst. Such improved method is believed to be distinctly different from the one thus known and can be applied to halogenated aryl ethers as well as to halogenated aryl-alkyl ethers.

To the accomplishment of the foregoing and related ends, the invention, then, consists of the steps hereinafter fully described and particularly pointed out in the claims, the foregoing setting forth but several of the various ways in which the principle of the invention may be utilized.

As indicated, the starting material for the present reaction is the halogenated ether corresponding with the amino ether which is to be produced. Such halogenated ethers are formed from the corresponding ethers in the usual way. For example, p-chlor phenetole may be prepared by ethylating p-chlor phenol and o-chlor anisole may be similarly prepared by methylating o-chlor phenol. Both of the most used halogens, viz.—chlorine and bromine, are well adapted for use in making such halogenated ethers. Furthermore, in the case of poly-halogen derivatives a different halogen may be attached to the respective aryl and alkyl groups, or the two aryl groups that are comprised in the ether proper.

The replacement of the halogen in such halogenated ether with the amino group is accomplished by reacting on the ether with ammonia in the presence of a suitable catalyst at a temperature of from approximately 150° to approximately 250° C., and under a pressure corresponding with the vapor tension of the reacting ingredients at such temperatures. The catalyst employed in the reaction is preferably a cuprous compound, e. g., cuprous oxide or chloride.

By way of specific example, in order to make p-phenetidine the following ingredients, viz:— 320 parts of aqueous ammonia sp. gr. 0.9, 157.5 parts of p-chlor phenetole and 28 parts of cuprous oxide are heated under an appropriate pressure for 14 hours to 225° C. At the end of the period indicated the reaction mixture is cooled and the reaction product is then separated into an oil and aqueous layer. The oil layer is then distilled, whereupon pure phenetidine is obtained, in a yield of 85% of the theoretical. The aqueous layer is treated with caustic soda to liberate ammonia and precipitate cuprous oxide and is then distilled for recovery of ammonia, followed by filtration for recovery of cuprous oxide. Other methods of working up the reaction product may of course be employed to accomplish the desired end.

Other halogenated aryl-alkyl ethers which may be similarly employed in carrying out the process are p-chlor anisole, o-chlor anisole, 4-chlor naphthyl methyl ether, 2-4-dichlor phenetole, chlor-nitro phenetole and 4-chlor-phenetole sulphuric acid. As an example of a halogenated aryl ether brom-diphenyl ether will serve. In the case of mono-halogen compounds the halogen group is replaced almost entirely. In the case of dihalogen compounds a mixture of diamino and amino-halogen derivatives results, although by the use of methyl alcohol as a solvent, the replacement of a second halo group by an amino group can be to a large extent prevented.

The cuprous oxide where employed as a catalyst may be recovered in the form of a precipitate consisting of a cupro-ammonium compound or other copper-containing material, and such precipitate has been found to work equally well as catalyst as does the original oxide.

It should be stated that in the practical utilization of the process, the reaction will be preferably carried out in a pressure vessel provided with heating means and suitable stirring means, whereby the reacting ingredients may be maintained in reactive relation and, in particular, the catalyst, in satisfactory state of suspension. For example, such vessel may be mounted upon trunnions, one or both of which is provided with suitable openings for inlet and outlet purposes, as for charging and emptying the vessel, and with driving gear to rotate said vessel for the purpose of agitating the contents. Heat may be applied by means of jacket heating, provision for supply of steam to same being through stuffing boxed connections at one or both trunnions, or the reactor may rotate in a hot air bath, or be heated by electric space heaters or any other method convenient.

Other modes of applying the principle of my invention may be employed instead of the one explained, change being made as regards the method herein disclosed, provided the step or steps stated by any of the following claims and the equivalent of such stated step or steps be employed.

I therefore particularly point out and distinctly claim as my invention:—

1. The method of making an amino-ether which comprises heating a compound of the general formula, X—R—O—R', wherein X represents a halogen substituent, R an aryl group, and R' a group selected from the class consisting of alkyl and aryl groups, with ammonia.

2. The method of making an amino-ether which comprises heating a compound of the general formula, X—R—O—R', wherein X represents a halogen substituent, R an aryl group, and R' a group selected from the class consisting of alkyl and aryl groups, with aqueous ammonia under super-atmospheric pressure.

3. The method of making an amino-ether which comprises heating a compound of the general formula, X—R—O—R', wherein X represents a halogen substituent, R an aryl group, and R' a group selected from the class consisting of alkyl and aryl groups, with aqueous ammonia under super-atmospheric pressure and in the presence of a copper-containing catalyst.

4. The method of making an amino-ether which comprises heating a compound of the general formula, Cl—R—O—R', wherein R represents an aryl group, and R' a group selected from the class consisting of alkyl and aryl groups, with aqueous ammonia under super-atmospheric pressure, and in the presence of a cuprous compound as catalyst.

5. The method of making an amino-ether which comprises heating a compound of the general formula,

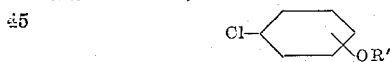

wherein R' represents an alkyl group, with ammonia.

6. The method of making an amino-ether which comprises heating a compound of the general formula,

wherein R' represents an alkyl group, with aqueous ammonia under super-atmospheric pressure.

7. The method of making an amino-ether which comprises heating a compound of the general formula,

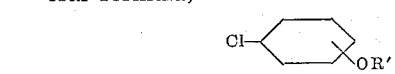

wherein R' represents an alkyl group, with aqueous ammonia under super-atmospheric pressure and in the presence of a copper-containing catalyst.

8. The method of making an amino-ether which comprises heating a compound of the general formula,

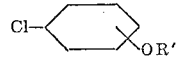

wherein R' represents an alkyl group, with aqueous ammonia under super-atmospheric pressure at a temperature between approximately 150 and approximately 250° C., and in the presence of a cuprous compound as catalyst.

9. The method of making para-phenetidine, which comprises heating a compound of the general formula,

wherein X represents a halogen substituent, with ammonia.

10. The method of making para-phenetidine, which comprises heating a compound of the general formula,

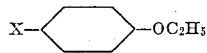

wherein X represents a halogen substituent, with aqueous ammonia under super-atmospheric pressure.

11. The method of making para-phenetidine, which comprises heating a compound of the general formula,

wherein X represents a halogen substituent, with aqueous ammonia under super-atmospheric pressure and in the presence of a copper-containing catalyst.

12. The method of making para-phenetidine, which comprises heating para-chlorophenetole with aqueous ammonia, under super-atmospheric pressure, at a temperature between approximately 150 and approximately 250° C., and in the presence of a cuprous compound as catalyst.

13. The cyclic process of making para-phenetidine which comprises heating para-chlorophenetole with aqueous ammonia under super-atmospheric pressure, at a temperature between approximately 150° and approximately 250° C., and in the presence of a copper-containing catalyst, cooling the reaction mixture, separating the crude para-phenetidine layer from the aqueous layer, precipitating a copper-containing sludge from the latter by adding caustic alkali thereto, and returning the sludge to the process.

14. The method of making an amino-ether which comprises heating a compound of the general formula, R—O—R', wherein R represents an aryl group, R' a member of the group consisting of aryl and alkyl residues, and wherein each aryl group may be substituted by at least one halogen substituent, with ammonia under super-atmospheric pressure and in the presence of a copper-containing catalyst.

EDGAR C. BRITTON.